March 10, 1970     A. BOIS     3,499,269
EXHAUST GAS PURIFYING DEVICES
Filed March 18, 1968
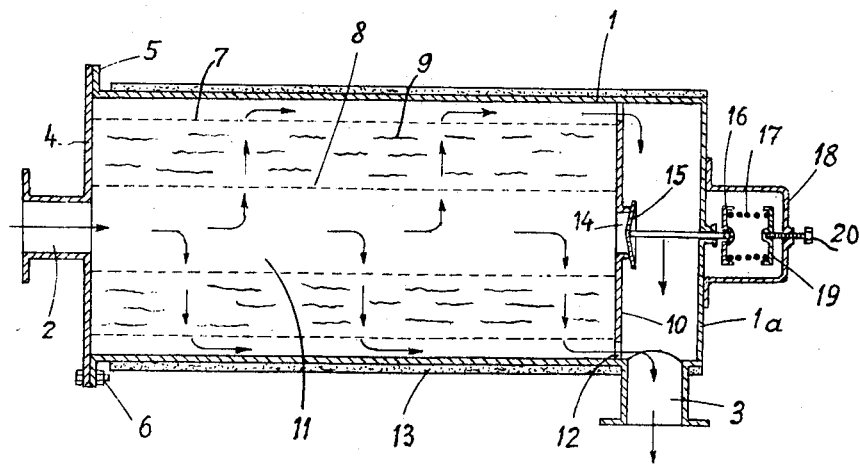
INVENTOR
ANTHELME BOIS
By *[signature]*
ATTORNEYS 3,499,269
EXHAUST GAS PURIFYING DEVICES
Anthelme Bois, Lyon, France, assignor to Automobiles
 M. Berliet, Lyon, Rhone, France,
Filed Mar. 18, 1968, Ser. No. 713,774
Claims priority, application France, Mar. 22, 1967,
99,871; Mar. 23, 1967, 100,018
Int. Cl. B01d 46/46
U.S. Cl. 55—309                               1 Claim

ABSTRACT OF THE DISCLOSURE

A device for purifying exhaust gases of thermal engines, which contain solid particles, notably diesel engines, this device comprising a filter element of refractory fibrous material capable of retaining the solid components of the exhaust gases led therethrough including a spring biased by-pass valve, and being characterised in that said refractory fibrous material consists of kaolin wool and that it is disposed so close to the engine that the temperature of the exhaust gases causes the ignition and therefore the combustion of the solid components such as soot, at least when the engine is operating under full-load condition.

---

The present invention is concerned with an improved device for purifying exhaust gases of thermal engines which contain solid components. Certain engines, such as diesel engines, release exhaust gases containing in addition to very small quantities of gaseous combustion products, such as carbon monoxides, nitrogen oxides, aldehydes and organic acids, components still in a solid state of which the principal one is soot, especially when considerable fuel quantities are injected. This soot, which results from the cracking of the fuel hydrocarbons, consists of very fine particles and has a very large specific surface area of the order of 200 to 300 square meters per gram (60,000 to 90,000 sq. ft. per oz.), so that it can adsorb aromatic polycondensates and other organic compounds, such as 3,4-benzopyrene, of which the cancerigenous character is well known.

As a result, the problem of cleaning or purifying exhaust gases notably of diesel engines consists primarily in eliminating soot therefrom. More particularly, this problem consists in eliminating relatively small quantities of extremely small solid particles of the order of .1 to $1\mu$, amounting to .1 to 3 grams per cubic meter (.00361 to 0.1083 lb. per cu. in.) of exhaust gas, from a stream of hot gases the output of which can vary at any time and may even attain a hundred cu. ft. per minute or more.

Hitherto known exhaust filter devices are objectionable mainly in that they are liable to clogging and must therefore be replaced at frequent intervals.

The applicant already proposed in a patent application Ser. No. 497,590 of Oct. 4, 1965, a purifying device of the catalytic type comprising a filter element of refractory fibrous material impregnated with a catalyst serving the purpose of promoting the ignition of any combustible gaseous products contained in the exhaust gases while ensuring at the same time the combustion of the retained solid components such as soot.

It is an important object of the present invention to provide a specific form of embodiment of this purifying device which aims at eliminating the visible black smoke from exhaust gases, excluding the gaseous products such as irritating gases or bad smells, this device being further characterised in that its cost is considerably lower than that of catalytic-type cleaners (since the reduction in the cost of the filter cartridge may be in the ratio of as much as 10 to 1), while having a greater efficiency than the aforesaid exhaust filters, but without the inconveniences thereof.

The device according to this invention is for purifying exhaust gases of thermal engines which contain solid particles, notably for diesel engines. The inventive device comprises a filter element of fibrous refractory material capable of retaining the solid components of the exhaust gases led therethrough. The fibrous material consists of kaolin wool. The device is disposed so close to the engine that the exhaust gas temperature ignites the solid components retained therein, such as soot, unless the engine is operated under full-load condition.

If the engine is operated rather frequently under full-load condition, the exhaust gases may be hot enough to ensure a constant or permanent combustion of the retained soot.

In this case, the combustion rate remains relatively low and is closely related to the exhaust gas temperature; a rapid combustion is actually obtained only when the temperature at the inlet end of the purifying device is about 600° C.

It was found that if under practical service conditions the engine is caused to operate at maximum speed and under full-load condition so as to raise the temperature to the above-given value, the purifying device itself can be thoroughly cleaned by rapidly burning the soot accumulated therein, within about ten minutes.

This high-speed engine operation may be accidental (i.e. due to the conditions of operation of the engine) or voluntary. In this last case a cleaning operation is also achieved.

It may be emphasized that the purifying device of this invention, although intended primarily for eliminating visible black smokes from exhaust gases, provides a satisfactory solution to the important problem of equipping town vehicles and more particularly town buses with diesel engines.

Thus, more particularly, kaolin wool utilized in the form of fibres about one inch long and having a diameter of about $3\mu$, is completely satisfactory. For instance, with an apparatus of the type described hereinafter a satisfactory result was obtained up to ten feet beyond the outlet of the engine exhaust manifold by using a conventional exhaust pipe.

Moreover, the use of a purifying device incorporating a filter element is attended by a counter-pressure in the engine exhaust, the counter-pressure caused by the filter element according to this invention being easily limited to a relatively low value, for example well below 200 grams per sq. cm. (2.85 lb. p. sq. in.).

However, in case of prolonged engine operation under maximum speed and full-load conditions, the exhaust manifolds and the exhaust cleaner case are gradually heated, so that the exhaust gases are no longer cooled as when running the engine intermittently at high speed and under full-load conditions. Due to their higher temperature, the gases are greatly expanded and produce extremely large outputs.

The pressure increment caused by this considerable output exerts undue strain on the filter element, which may even destroy it if these extreme operating conditions are maintained during a relatively long time; besides, it may be noted that if purifying devices dimensioned to meet the severest operating conditions were used their cost would become excessive and their over-all dimensions would become prohibitive and prevent a convenient mounting on the vehicles to be equipped for the purpose contemplated.

This invention further provides a solution to the problem set forth hereinabove by adding to the purifying device a safety valve so disposed and calibrated that it will allow the gas to escape from the filter element when a predetermined exhaust pressure value is attained. This safety valve will thus constitute an efficient means for stopping dangerous counter-pressure generated as explained hereinabove, without causing on the other hand any disturbance in the normal operation of the purifying device.

The conditions necessary for opening this safety valve are seldom those corresponding to the maximum release of black smoke through the exhaust. Thus, for example, when the engine is rapidly accelerated from the idling speed, the safety valve is not actuated and the filter will retain most of the smoke normally released under such circumstances.

The provision of this safety valve will extend to a considerable degree the useful life of the filters mounted on engines of relatively great cubic capacity in automotive vehicles.

Moreover, the counter-pressure limitation resulting from the use of this safety valve is also useful in that it will prevent the engine power output from being curtailed to an appreciable degree at maximum speed.

The single figure of the attached drawing illustrates diagrammatically by way of example a typical form of embodiment of the device constituting the subject-matter of this invention. This figure is an axial longitudinal section taken along an exhaust gas purifying device equipped with a safety valve.

The device illustrated consists of a silencer 1 having an inlet pipe 2 and a gas outlet pipe 3. The inlet pipe 2 is rigid with an end plate or cover 4 secured in a fluid-tight manner to the main body of the silencer 1, the end plate or cover 4 being secured to the main body 1 for example by means of flange 5 and bolts 6.

Within the body 1 and secured to the end plate 4 is a cylindrical hollow filter element consisting of two concentric cylindrical wire-mesh members 7 and 8, for example stainless-steel fine-mesh members. The annular space formed between these wire-mesh elements 7 and 8 is stuffed with filtering material 9 consisting of kaolin-wool refractory fibres.

The two cylindrical wire-mesh stainless-steel members 7 and 8 are welded to a bottom plate 10 closing completely the central passage 11 for the gases as well as the annular space between these members. This bottom plate acts as a member for centering the filter and engages the inner wall of the cylindrical body 1. Peripheral notches 12 are formed in the outer edge of this plate 10 to permit the passage of exhaust gases therethrough.

The complete device is surrounded by a heat-insulating sheath 13 for example of asbestos fabric, adapted to be protected in turn from shocks and stonethrows by a metal cover (not shown).

The aforesaid safety valve may be easily mounted with a view to cause it to co-act with a discharge port 14 provided in the central portion of the bottom plate 10, i.e. within the filter element. This valve comprises a valve member 15 normally seated on the edge of port 14 and provided with a shank extending through the bottom of body 1 and engaging a bearing cup 16 urged towards the body 1 by a compression spring 17 isolated from the exhaust gases by being housed in a small case 18 secured to the bottom plate 1a closing the rear of the body 1. The spring 17 is adjustable by means of another bearing cup 19 associated with an adjustment screw 20.

It is clear that when this valve is opened by the gas pressure, i.e. when the latter exceeds a predetermined value, the inlet and outlet pipes 2, and 3 of the device communicate directly with each other, thus allowing a direct exhaust of the gases which by-pass the filter element as long as the over-pressure prevails.

Of course, any other suitable valve type may be used for the same function without departing from the spirit and scope of the invention.

I claim:
1. A device for purifying thermal engine exhaust gases containing solid particles, notably diesel engines comprising a closed cylindrical casing having an inlet centrally located in one end wall of the casing and an outlet at the opposite end of the casing from said inlet, a hollow cylindrical filter element of refractory fibrous material consisting of kaolin wool having long-staple fibers and including inner and outer screens capable of retaining the solid components of the exhaust gases led therethrough, said element being disposed coaxially within said casing about said inlet and forming an annular space between said casing and said filter element, means for allowing said gases to pass axially into one end of and radially outwardly through said filter element to said annular space entrapping the solid components of the exhaust gases in said element, the end of the filter element adjacent the outlet being positioned against a plate having a central aperture, a spring-biased adjustable safety valve means disposed at and normally closing the central aperture, said valve means being opened by the exhaust gas pressure in said device exceeding a predetermined value to bypass flow of the exhaust gases through the center of said filter element and through the central aperture to the outlet, and said device being adapted to be mounted closely adjacent the engine whereby the temperature of the exhaust gases causes the ignition and therefore the combustion of the solid components entrapped in said element at least when the engine is operating under a full-load condition.

References Cited
UNITED STATES PATENTS

| | | | |
|---|---|---|---|
| 1,195,983 | 8/1916 | Farmer | 55—313 |
| 1,747,882 | 2/1930 | Prazmo | 55—267 |
| 2,170,074 | 8/1939 | Hewitt | 55—313 |
| 2,642,084 | 6/1953 | Lynch | 55—309 |
| 2,758,671 | 8/1956 | Silverman et al. | 55—527 |
| 2,821,261 | 1/1958 | Vixler et al. | 55—527 |
| 3,166,895 | 1/1965 | Slayter et al. | 60—29 |
| 3,212,641 | 10/1965 | Komarmy | 210—509 |
| 3,224,171 | 12/1965 | Bowman | 55—313 |
| 3,364,661 | 1/1968 | Manherz et al. | 55—267 |
| 2,933,254 | 4/1960 | Lauterbach | 55—528 |
| 1,479,714 | 1/1924 | Herdle. | |

HARRY B. THORNTON, Primary Examiner

BERNARD NOZICK, Assistant Examiner

U.S. Cl. X.R.

55—512, 527; 60—29